(12) United States Patent
Blanc et al.

(10) Patent No.: US 7,400,629 B2
(45) Date of Patent: Jul. 15, 2008

(54) CAM BASED SYSTEM AND METHOD FOR RE-SEQUENCING DATA PACKETS

(75) Inventors: Alain Blanc, Tourrettes sur Loop (FR); Rene Glaise, Nice (FR); Michel Poret, Gattieres (FR); Rene Gallezot, La Colle sur Loop (FR)

(73) Assignee: International Business Machines Corporation, Armonk, NY (US)

( * ) Notice: Subject to any disclaimer, the term of this patent is extended or adjusted under 35 U.S.C. 154(b) by 836 days.

(21) Appl. No.: 10/723,834

(22) Filed: Nov. 26, 2003

(65) Prior Publication Data
US 2004/0141510 A1    Jul. 22, 2004

(30) Foreign Application Priority Data
Dec. 19, 2002   (EP) .................. 02368136

(51) Int. Cl.
*H04L 12/28* (2006.01)

(52) U.S. Cl. ............ 370/394; 370/360; 370/386; 370/401; 370/412

(58) Field of Classification Search ........ 370/394, 370/389, 252, 412, 42, 360, 386, 401
See application file for complete search history.

(56) References Cited

U.S. PATENT DOCUMENTS 6,967,951 B2 * 11/2005 Alfano ................ 370/394
2003/0214949 A1 * 11/2003 Shaikli ................ 370/394

* cited by examiner

*Primary Examiner*—Ricky Ngo
*Assistant Examiner*—Kibrom T Hailu
(74) *Attorney, Agent, or Firm*—Joscelyn G. Cockburn

(57) ABSTRACT

A system for resequencing data packets is disclosed. In a preferred embodiment, the system operates in a parallel packet switch architecture having at least one egress adapter arranged to receive data packets issued from a plurality of ingress adapters and switched through a plurality of independent switching planes. Each received data packet belongs to one sequence of data packets among a plurality of sequences where the data packets are numbered with a packet sequence number (PSN) assigned according to at least a priority level of the data packet. Each data packet received by the at least one egress adapter is further having a source identifier to identify the ingress adapter from which it is issued. The system for restoring the sequences of the received data packets operates within the egress adapter and comprises buffer for temporarily storing each received data packet at an allocated packet buffer location. Furthermore, controller to extract the packet sequence number, the source identifier and the priority level of each stored data packet. And determination means coupled to the storing means and to the extracting means allow to determine for each sequence of data packet the order of the data packets to be output from the egress adapter.

4 Claims, 6 Drawing Sheets

CAM BASED SYSTEM AND METHOD FOR RE-SEQUENCING DATA PACKETS

CROSS REFERENCE TO RELATED PATENT APPLICATIONS

The present invention is related to the following patent applications which are incorporated herein by reference:

Ser. No. 10/723,503 entitled "Packet Unstopper System for a Parallel Packet Switch", filed Nov. 26, 2003;

Ser. No. 10/722,900 entitled "System and Method for Sequencing Data Packets on a Per-Flow Basis", filed Nov. 26, 2003;

Ser. No. 10/722,901 entitled "Method and System for Resequencing Data Packets Switched Through a Parallel Packet Switch", filed Nov. 26, 2003.

FIELD OF THE INVENTION

The present invention relates to high speed switching in general and more particularly to a system and method to restore the sequence of data packets switched through independent planes of a Parallel Packet Switch.

BACKGROUND OF THE INVENTION

DWDM, which stands for Dense Wavelength Division Multiplexing, by merging onto a single optical fiber many wavelengths, is making available long-haul fiber-optic data communications links of huge aggregate capacity. Each wavelength is an independent communications channel which typically operates at OC48c i.e.: 2.5 Giga or $10^9$ bits per Second (Gbps), OC192c (10 Gbps) and in some systems at OC768c (40 Gbps). These rates are part of a family of rates and formats available for use in optical interfaces, generally referred to as SONET, which is a standard defined by the American National Standards Institute (ANSI) of which there exists an European counterpart, mostly compatible, known as SDH (Synchronous Digital Hierarchy). Thus, at each node of a network, the data packets or cells carried on each DWDM channel must be switched, or routed, by packet-switches that process and then switch packets between different channels so as to forward them towards their final destination. Ideally, it would be desirable to keep the processing of packets in the optical domain, without conversion to electronic form; this is still not really feasible today mainly because all packet-switches need buffering that is not yet available in an optical form. So packet-switches will continue to use electronic switching technology and buffer memories for some time to come.

However, because of the data rates as quoted above for individual DWDM channels (up to 40 Gbps) and the possibility of merging tenths, if not hundredths, of such channels onto a single fiber the throughput to handle at each network node can become enormous i.e., in a multi Tera or $10^{12}$ bits per second range (Tbps) making buffering and switching, in the electronic domain, an extremely challenging task. If constant significant progress has been sustained, for decades, in the integration of always more logic gates and memory bits on a single ASIC (Application Specific Integrated Circuit), allowing to implement the complex functions required to handle the data packets flowing into a node according to QoS (Quality of Service) rules unfortunately, the progress in speed and performance of the logic devices over time is comparatively slow, and now gated by the power one can afford to dissipate in a module to achieve it. Especially, the time to perform a random access into an affordable memory e.g., an imbedded RAM (Random Access Memory) in a standard CMOS (Complementary MOS) ASIC, is decreasing only slowly with time while switch ports need to interface channels having their speed quadrupling at each new generation i.e., from OC48c to OC192c and to OC768c respectively from 2.5 to 10 and 40 Gbps. For example, if a memory is 512-bit wide allowing to store or fetch, in a single write or read operation, a typical fixed-size 64-byte (8-bit byte) packet of the kind handled by a switch, this must be achieved in less than 10 Nano or $10^{-9}$ second (Ns) for a 40 Gbps channel and in practice in a few Ns only in order to take care of the necessary speed overhead needed to sustain the specified nominal channel performance while at least one store and one fetch i.e., two operations, are always necessary per packet movement. This represents, nowadays, the upper limit at which memories and CMOS technology can be cycled making the design of multi Tbps-class switch extremely difficult with a cost-performance state-of-the-art technology such as CMOS, since it can only be operated at a speed comparable to the data rate of the channel they have to process.

Hence, to design and implement a high capacity packet-switch (i.e.: having a multi Tbps aggregate throughput) from/to OC768c (40 Gps) ports a practical architecture, often considered to overcome the above mentioned technology limitation, is a Parallel Packet Switch (PPS) architecture. It is comprised of multiple identical lower-speed packet-switches e.g., (100) operating independently and in parallel, as sketched in FIG. 1. In each ingress port adapter, such as (110), an incoming flow of packets (120) is spread (130), packet-by-packet, by a load balancer across the slower packet-switches, then recombined by a multiplexor (140) in the egress part of each port adapter e.g., (150). As seen by an arriving packet, a PPS is a single-stage packet-switch that needs to have only a fraction of the performance necessary to sustain the port data rate. If four planes (100, 102, 104 and 106) are used, as shown in FIG. 1, they need only to have one fourth of the performance that would otherwise be required to handle a full port data rate. More specifically, four independent switches, designed with OC192c ports, can be associated to offer OC768c port speed, provided that ingress and egress port adapters (110, 150) are able to load balance and recombine the packets. This approach is well known from the art and sometimes referred to as 'Inverse Multiplexing' or 'load balancing'. Among many publications on the subject one may e.g., refer to a paper published in Proc. ICC'92, 311.1.1-311.1.5, 1992, by T. ARAMAKI et al., untitled '*Parallel "ATOM" Switch Architecture for High-Speed ATM Networks*' which discusses the kind of architecture considered here.

The above scheme is also attractive because of its inherent capability to support redundancy. By placing more planes than what is strictly necessary it is possible to hot replace a defective plane without having to stop traffic. When a plane is detected as being or becoming defective ingress adapter load balancers can be instructed to skip the defective plane. When all the traffic from the defective plane has been drained out it can be removed and replaced by a new one and load balancers set back to their previous mode of operation.

Thus, if PPS is really attractive to support multi-Gbps channel speeds and more particularly OC768c switch ports it remains that this approach introduces the problem of packet re-sequencing in the egress adapter. Packets from an input port (110) may possibly arrive out of sequence in a target egress adapter (150) because the various switching paths, here comprised of four planes (100), do not have the same transfer delay since they run independently thus, can have different buffering delays. A discussion and proposed solutions to this problem can be found, for example, in a paper by Y. C. JUNG et al., 'Analysis of out-of-sequence problem and preventive schemes in parallel switch architecture for high-speed ATM network', published in IEEE Proc.-Commun., Vol. 141, No. 1, February 1994. However, this paper does not consider the practical case where the switching planes have also to handle packets on a priority basis so as to support a Class of Service (CoS) mode of operation, a mandatory feature in all recent switches which are assumed to be capable of handling simultaneously all sorts of traffic at nodes of a single ubiquitous network handling carrier-class voice traffic as well as video distribution or just straight data file transfer. Hence, packets are processed differently by the switching planes depending on the priority tags they carry. This does no longer comply with the simple FCFS (First-Come-First-Served) rule assumed by the above referenced paper and forces egress adapters to readout packets as soon as they are ready to be delivered by the switching planes after which they can be resequenced on a per priority basis. Also, the above paper implicitly assumes the use of a true time stamp (TS) which means in practice that all port-adapters are synchronized so as packets from different sources are stamped from a common time reference which is a difficult and expensive requirement to meet.

Another difficulty with a PPS architecture stems from the fact that networks must not only support UC (unicast) traffic (one source to one destination) but also MC (multicast) traffic that is, traffic in which a source may have to send a same flow of packets to more than one destination. Video distribution and network management traffic are of this latter case (e.g., the IP suite of protocols assumes that some control packets must be broadcast). For example, with a 64-port switch there are only 64 UC flows (times the number of priorities) for each source since there are only 64 possible destinations. However, there may have anything from none to tenths of thousands of MC flows to be supported in such a switch, each one being identified by a unique MCid (MC identifier) thus, specifying to what particular combination of more than one destination a packet of a MC flow must be forwarded from a same source. Therefore, to overcome the problem introduced by the transfer delays different in the independent planes a simple numbering of UC packets at source i.e., in each ingress adapter, can be envisaged to allow re-sequencing in the egress adapters. This, however, does fit with MC traffic because of the multiplicity of possible combinations of destinations from a same source. For example, MC packets numbered with a simple complete ascending sequence (n, n+1, n+2, etc.), sent from a same source and received in different combinations of egress adapters, as specified by their MCid, will generally create incomplete sequences of packet numbers since destinations are obviously not all the same from one MCid to another one.

Finally, in the context of a PPS switch, the traditional way of handling packets readout in the egress adapters does no longer fits either. In a traditional single plane switch no disordering in the delivery of the switched packets is introduced by the switching unit (other than the 'disordering' introduced by the handling of packets on the basis of their priorities). This allows forming LL's (linked lists) of packets, per priority, implicitly remembering their order of arrival thus, the order in which they must be forwarded within a priority class. Appending a new element to a LL i.e., always to LL tail, is a relatively easy task even though this must be done at the very high speeds previously mentioned. However, inserting a packet in the right place of a linked list is much more complicated. This requires to first determine where packet must be inserted, since packets are not guaranteed to be received in the right order then, update the links to a next and from a previous element.

Forming LL's has been the subject of numerous publications. For a discussion on this subject, so as to evaluate the difficulties encountered to carry out in hardware, at the speed required by a Terabit-class switch, the insertion of a new element in a LL, one may refer, e.g., to a book by Robert Sedgewick, 'Algorithms', second edition, Addison-Wesley, 1988, ISBN 0-201-06673-4 and more specifically to chapter 3 'Elementary Data Structures'.

Thus, in view of the difficulties of prior art arrangements as mentioned here above, there is a need for a resequencing solution in order to make feasible a PPS architecture in which variable delays can be experienced in the individual switching planes while supporting priority classes of unicast and multicast traffic in view of the implementation of a multi-Tbps switch.

The present invention offers such solution.

SUMMARY OF THE INVENTION

It is therefore an object of the invention to provide a system and method to restore sequences of data packets in the egress adapters of a parallel packet switch architecture.

It is another object of the invention to support resequencing of unicast as well as multicast traffic with a unique mechanism having a common set of resources.

It is still another object of the invention to provide ingress adapters that neither need to be synchronized nor require to use a true time stamp to mark the packets.

In an embodiment, the system operates in a parallel packet switch architecture having at least one egress adapter arranged to receive data packets issued from a plurality of ingress adapters and switched through a plurality of independent switching planes. Each received data packet belongs to one sequence of data packets among a plurality of sequences where the data packets are numbered with a packet sequence number (PSN) assigned according to at least a priority level of the data packet. Each data packet received by the at least one egress adapter is further having a source identifier to identify the ingress adapter it is issued from. The system for restoring the sequences of the received data packets operates within the egress adapter and comprises means for temporarily storing each received data packet at an allocated packet buffer location. Furthermore, extracting means allow to extract the packet sequence number, the source identifier and the priority level of each stored data packet. And determination means coupled to the storing means and to the extracting means allow determination for each sequence of data packet the order of the data packets to be output from the egress adapter.

The resequencing system operates for each received data packet according to the following resequencing method: at each received data packet, a packet buffer location is allocated to the received data packet which is temporarily stored at the allocated packet buffer location. A source-priority register is identified by the source identifier and the priority level of the stored data packet. The source-priority register contains a packet sequence number (PSN) and a packet buffer location identifier (ID) of a previously received data packet. The source-priority register is also associated to a valid-bit latch that indicates an active/not active status. In order to determine if the received data packet is to be output as the next data packet of a respective sequence of data packets, the status of the valid-bit latch is checked and the packet sequence number of the received data packet is compared with the packet sequence number contained within the pointed source-priority register.

Further objects, features and advantages of the present invention will become apparent to the ones skilled in the art upon examination of the following description in reference to the accompanying drawings. It is intended that any additional advantages be incorporated herein.

DETAILED DESCRIPTION OF AN EMBODIMENT

Figure 1:
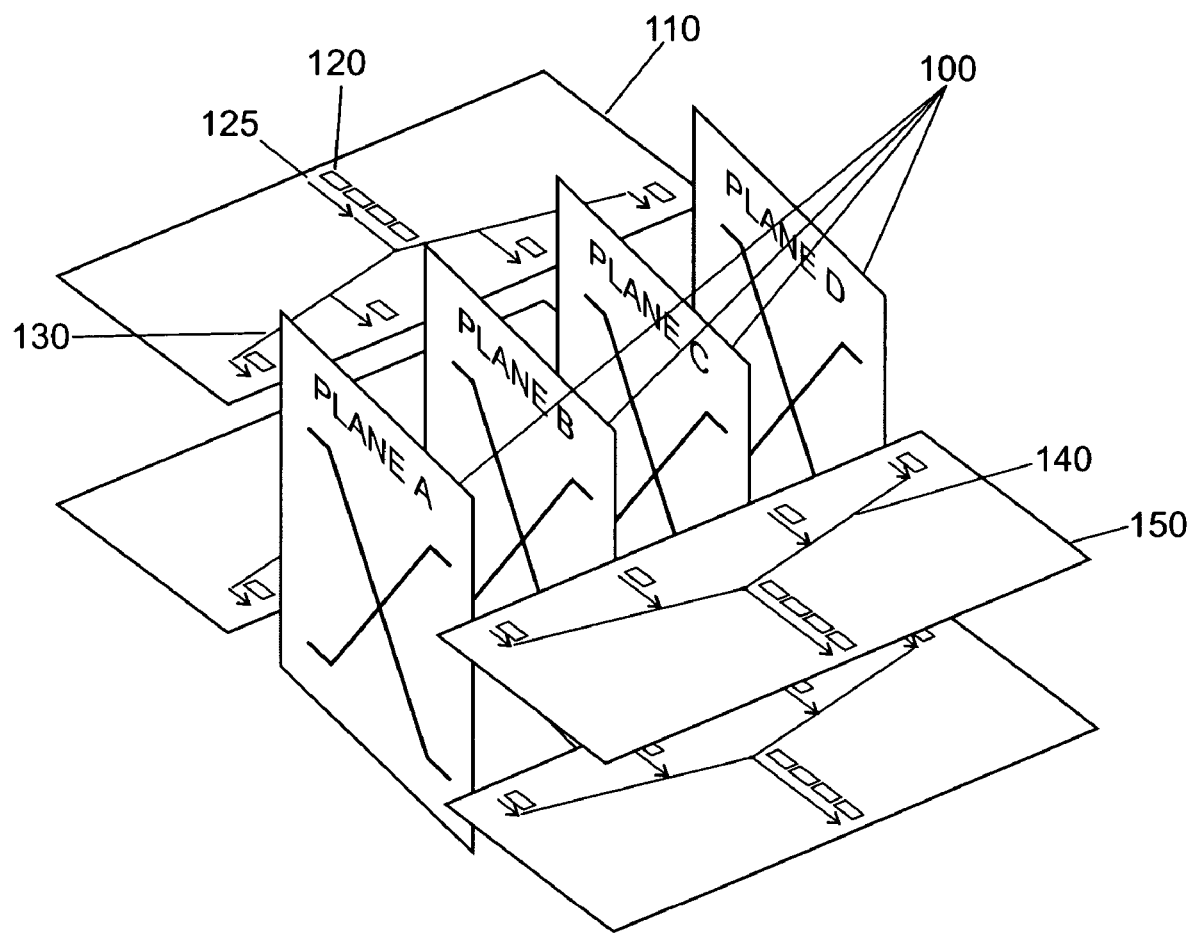
FIG. 1 shows a conceptual view of a parallel packet switch system to implement the invention.
Figure 2:
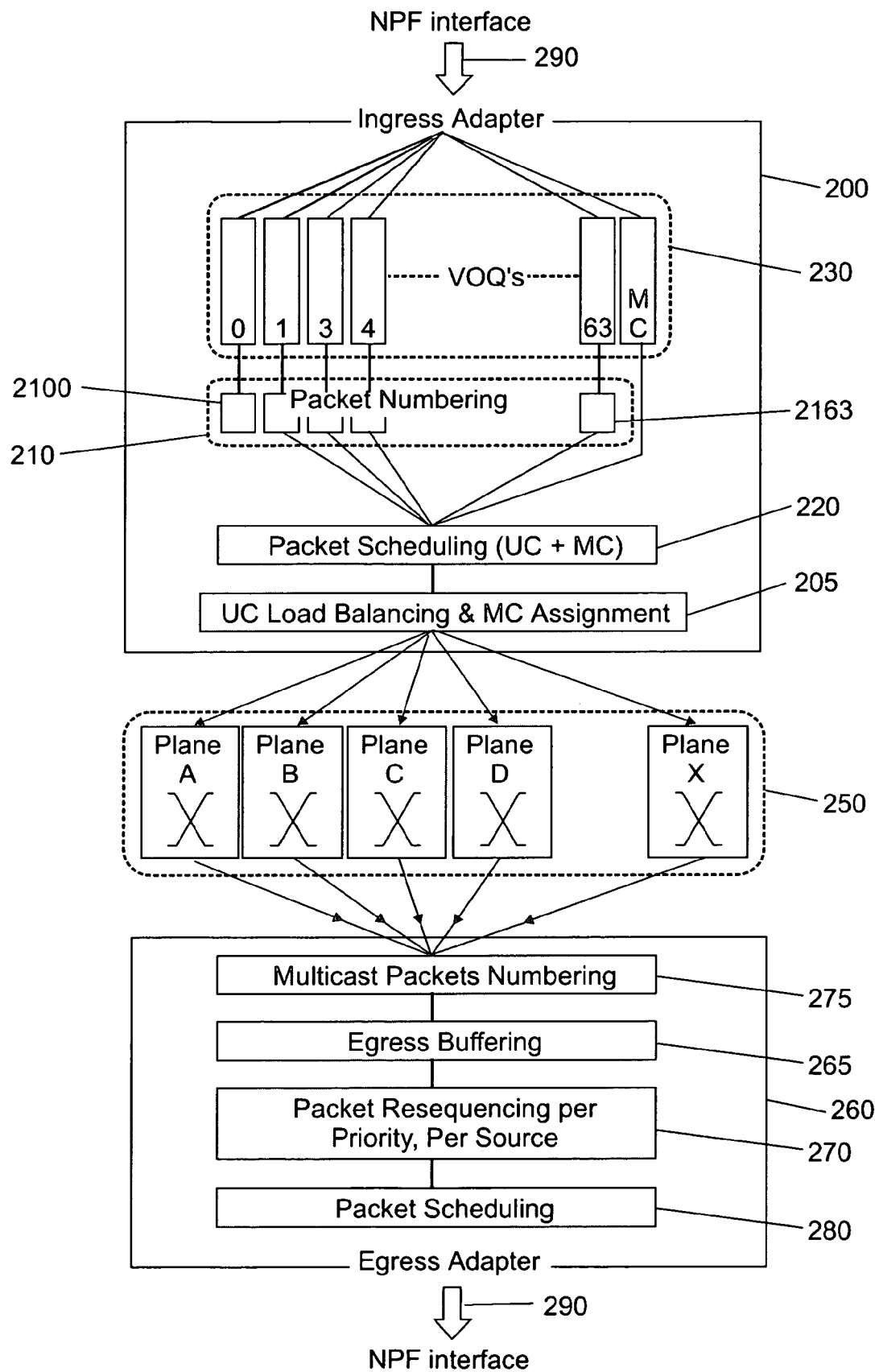
FIG. 2 is a block diagram showing the main components of a preferred embodiment of the invention.

FIG. 2 shows a functional view of a PPS architecture according to the invention. For sake of clarity, only one ingress adapter (200) is shown interfacing a plurality of switching planes (planes A to X under block 250) over which an incoming traffic (290) of data packets is load balanced by a load balancer circuit (205). The skilled man will easily understand through the reading of the entire description that all functional principles described for one ingress adapter may be generalized to a plurality of ingress adapters.

To allow the re-sequencing of data packets in the egress adapters (260), prior to or while load-balancing, all unicast packets are numbered per priority and per destination (2100 to 2163) in the ingress adapter. It is to be noted that the numbering performed for a unicast packet from one source towards one destination, is completely unrelated with the numbering performed by the same source towards other destinations, and is also unrelated with the numbering performed by the other sources. This is possible because as will be further detailed, each destination sorts the packets it receives per priority and per source, these ones belonging to independent flows.

In the preferred described PPS implementation, only the unicast traffic is load balanced while multicast packets are sent by each source to their multiple destinations always through at least one pre-assigned switching plane (thus, multicast traffic flows are pre-assigned to specific switching planes e.g., on the basis of groups of destination ports). Hence, there is not the requirement of having to number MC packets at source since the invention preferably assumes that MC flows are always switched through the same switching plane which does not introduce any disordering. Contrary to UC packets, MC packets are thus numbered at destination (275), in each egress adapter (260), so as to avoid the problem discussed in the background section on the numbering in sources of traffic with multiple destinations while allowing to implement a single mechanism that works both for UC and MC traffic. This is further discussed hereafter and described in following figures.

In practice the numbering of MC packets at destinations can be carried out in different equivalent ways. MC packets can indeed be numbered on the basis of their actual source i.e., the ingress adapter MC VOQ (230) from which they are issued. However, because MC traffic flows are assigned to specific planes there is no real need to do so and an alternate solution, that might be preferred, is to consider that switching planes are actually, in each egress adapter, the sources of MC flows instead. Because there are generally, in a PPS structure, fewer planes than switch ports, this requires fewer resources in egress adapters. Obviously, whichever solution is adopted, the numbering must be performed per priority too. The rest of the description of the invention broadly refers to the source of MC packets as being, equivalently, either the MC VOQ in the ingress adapters or the switching planes. Thus, it is to be understood that a plurality of independent counters per source allocate a sequential packet number to each incoming data packet according to the priority level.

Then, packets received through the various planes (250) are temporarily stored in an Egress Buffer (265). As mentioned earlier, reading out the packets from the switch planes must be done without delay since planes are assumed to process packets on a per priority basis too and, in no case, a packet of lower priority should stay in the way of a higher priority packet since this would create a priority HoL (head of line) blocking. As already stated above, the invention assumes that the counters used to rank unicast packets (2100 to 2163) are not required to be in synchronism in the various ingress adapters. Also, multicast packets are numbered (275) per plane (and per priority) when they arrive in Egress Adapter. As a consequence, packets from different sources cannot (and need not to) be compared to restore their sequence. In other words, the invention assumes that packet resequencing is not only performed independently on a per priority basis but as well on the basis of their source (270). Hence, packets are read out as soon as they are ready to leave the switch planes in order to perform resequencing in each unicast where they need to be temporarily stored (265).

In a preferred implementation, the above mode of operation i.e., resenquencing per priority and per source, further assumes that each egress adapter is equipped with an output scheduler (280), role of which is to select, at each packet cycle, the next packet, temporarily stored in the Egress Buffer (265), due to leave the egress adapter. Egress packet scheduling is a mechanism which is beyond the scope of the invention and is not further discussed other than to mention that its role is normally to serve the waiting packets of highest priorities first while, for each priority, maintaining fairness between the sources of traffic that are independently resequenced.

There is also a similar packet scheduling function (220) in each ingress port-adapter which selects the waiting incoming packets to be switched. Generally, waiting packets are organized under the form of VOQ's (Virtual Output Queues) (230), a scheme well-known from the art which prevents priority and port destination HoL blocking in the ingress adapters so that a waiting incoming packet can neither be blocked by a lower priority packet nor by a packet destined for a busy switch output-port. These are standard functions in switch port-adapters. Packet scheduling (220, 280) and VOQ's (230) are not part of the invention which does not require any specific behavior from these elements to operate as specified in the rest of the description.

FIG. 2 and following figures illustrate the invention assuming that the switch is a 64-port switch, so VOQ's have 64 unicast (UC) destinations (0-63) per priority plus the multicast (MC) destination. For this latter case there is, per flow, only one packet sent to one of the switching planes as defined to the load balancing function for this source (205). Switching plane must replicate it to the multiple destinations concerned by the multicast flow to which packet belongs. It must be noticed that, in contrast with unicast flows where only one single counting resource is required per VOQ, in case of multicast flows, no counting resource is required in Ingress Adapter (200). However, as described above, the required numbering function is performed in Egress Adapter (275) which inserts, in MC packets, a PSN (packet sequence number) e.g., under the form of a complete ascending sequence n, n+1, n+2, etc. on a per source and per priority basis to stay compatible with UC numbering.

It is to be appreciated that generally switch port-adapters have a standard line or NP (network processor) IN and OUT interface (290) e.g., such as the ones defined by the Network Processing Forum (NPF), 39355 California Street, Suite 307, Fremont, Calif. 94538.

Figure 3:
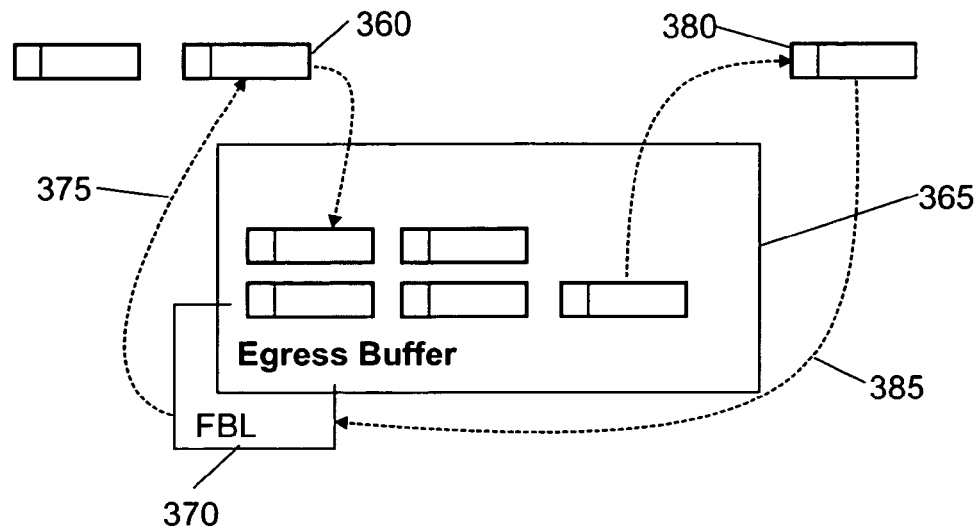
FIG. 3 is a block diagram of the main components of the egress buffering of FIG. 2.

FIG. 3 shows how is organized the Egress Buffering function (265) of FIG. 2 in an embodiment of the invention. Each incoming packet (360) switched through any of the PPS planes, is temporarily stored in an egress buffer (365) in an unconditional manner. The egress buffer is typically made of a RAM (Random Access Memory) either internal to an ASIC (Application Specific Integrated Circuit) used to implement the Egress port-adapter functions or is using commercially available discrete RAM modules controlled by the ASIC. The invention assumes there is enough buffering provided to allow resequencing of all packet flows being handled in egress adapter at any moment. The upper value to consider is highly dependent on the operation of the switching planes used to implement the PPS structure. Especially, it depends on the number of priorities they are handling and of how much traffic they have to sustain under a worst case scenario of traffic corresponding to the application for which the switching function is devised. A typical parameter influencing the size of the buffer is the burstiness of the traffic i.e., the probability of having a series of N consecutive packets, at a same level of priority, all destined for the same port. This may be highly disturbing for the rest of the traffic creating contention and resulting in the holding of lower priority packets in some middle switching planes thus, preventing some flows from being resequenced while packets are already waiting in the egress buffer taking up space. Preferably, the buffer size is dimensioned to allow resequencing under worst case conditions. In practice this is achieved by having a flow control implemented between the various components of the switching function i.e., the ingress and egress adapters and the individual switch planes. To help reach this objective a Waiting Packet counter (WPC) and a timer may be implemented as optional features, as it is described later.

Then, associated to the egress buffer (365) there a list of free buffers or FBL (Free Buffer List) (370). With each incoming packet (360) a free buffer location is withdrawn (375) from FBL so that packet can immediately be stored within the corresponding packet buffer. This is done irrespective of the priority, the rank and the plane through which the data packet arrived in the egress adapter.

Figure 4:
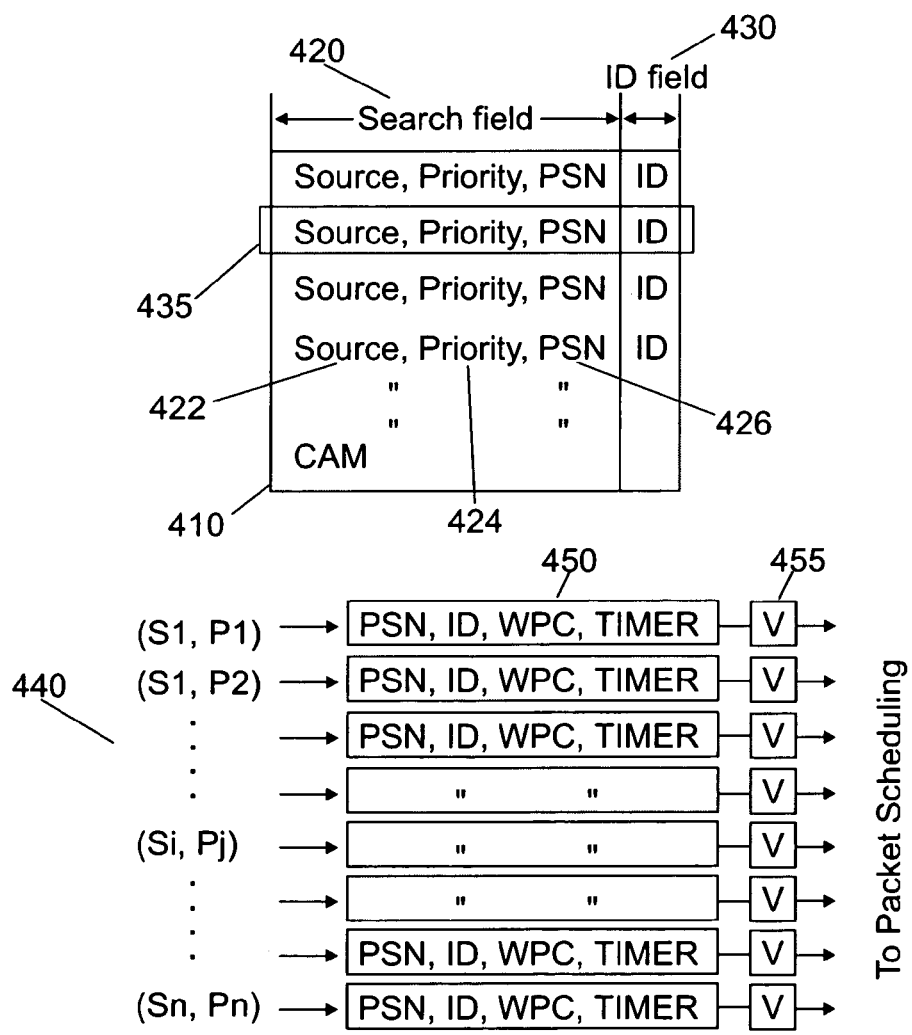
FIG. 4 details the resequencing CAM based mechanism implemented in the egress adapter.

FIG. 4 shows the hardware resources required by the present invention to implement the resequencing of packets (360) received through the different switching planes. There are required a Content Addressable Memory (CAM) (410) and a set of registers and latches (440). CAM (410) contains as many entries (435) as there are available packet buffers in the Egress Buffer (365). Thus, there is a one to one correspondence between one packet buffer of the Egress Buffer (365) and one CAM entry (435). Each CAM entry (435) consists in two fields: one Search Field (420) and one ID field (430). The ID field contains a packet buffer identification used to identify each packet buffer location in the Egress Buffer (365). In a preferred embodiment of the invention it is simply the unique buffer address as selected by FBL (370) of FIG. 3 and used as an ID of packet while stored in egress buffer. The Search Field (420) is build up using three sub-fields: a source identification field (422), a priority level field (424) and a Packet Sequence Number (PSN) field (426). As already discussed, PSN is allocated by the unicast Packet Numbering logic (2100 to 2163) for unicast traffic, or by the Multicast Packet Numbering logic (275) for multicast traffic.

As it will be further detailed with reference to FIG. 5, the search field is updated at the time a new packet is stored into the Egress Buffer (365) if the algorithm described in FIG. 5 determines that a new entry should be made in the CAM (410).

The set of registers and latches (440) is coupled to the the CAM and contains as many registers (450) and latches (455) as there are sources and priority levels. As an example, in an implementation featuring 64 possible sources and 8 priorities with a load balancing of unicast traffic over 6 switching planes, there are required 64×8=512 registers (450) and latches (455) for unicast traffic. In addition, considering the switch planes as the sources of the MC traffic, 6×8=48 more registers (450) and latches (455) are required for this type of traffic. It is to be noted that for sake of clarity the registers are denoted source-priority registers in the continuing description. The term 'source' is to be interpreted either as the ingress adapter for unicast traffic or a as the switching plane for multicast traffic. Similarly, for sake of clarity the latches are denoted valid-bit latches.

Each valid-bit latch (455) allows setting a valid bit V to indicate to the Packet Scheduler (280) that at least one packet is available for scheduling. This available packet is the one stored in the packet buffer identified by the ID field contains in the corresponding source-priority register (450). The Packet Sequence Number stored in this same source-priority register (450) indicates the current packet number of this packet.

Then, valid bits contain in valid-bit latches (455) are used as inputs to the Packet Scheduler logic (280). Once an available packet has been processed by Packet Scheduler logic (280) and presented over the NPF Interface (290), the corresponding valid bit V is either kept activated or is deactivated as it will be further explained with reference to FIG. 6.

Each source-priority register is made of two mandatory fields to contain a Packet Sequence Number (PSN) and a buffer address ID, and optional fields to contain a Waiting Packet Count (WPC) and a Timer. The source-priority register is detailed later on.

Figure 5:
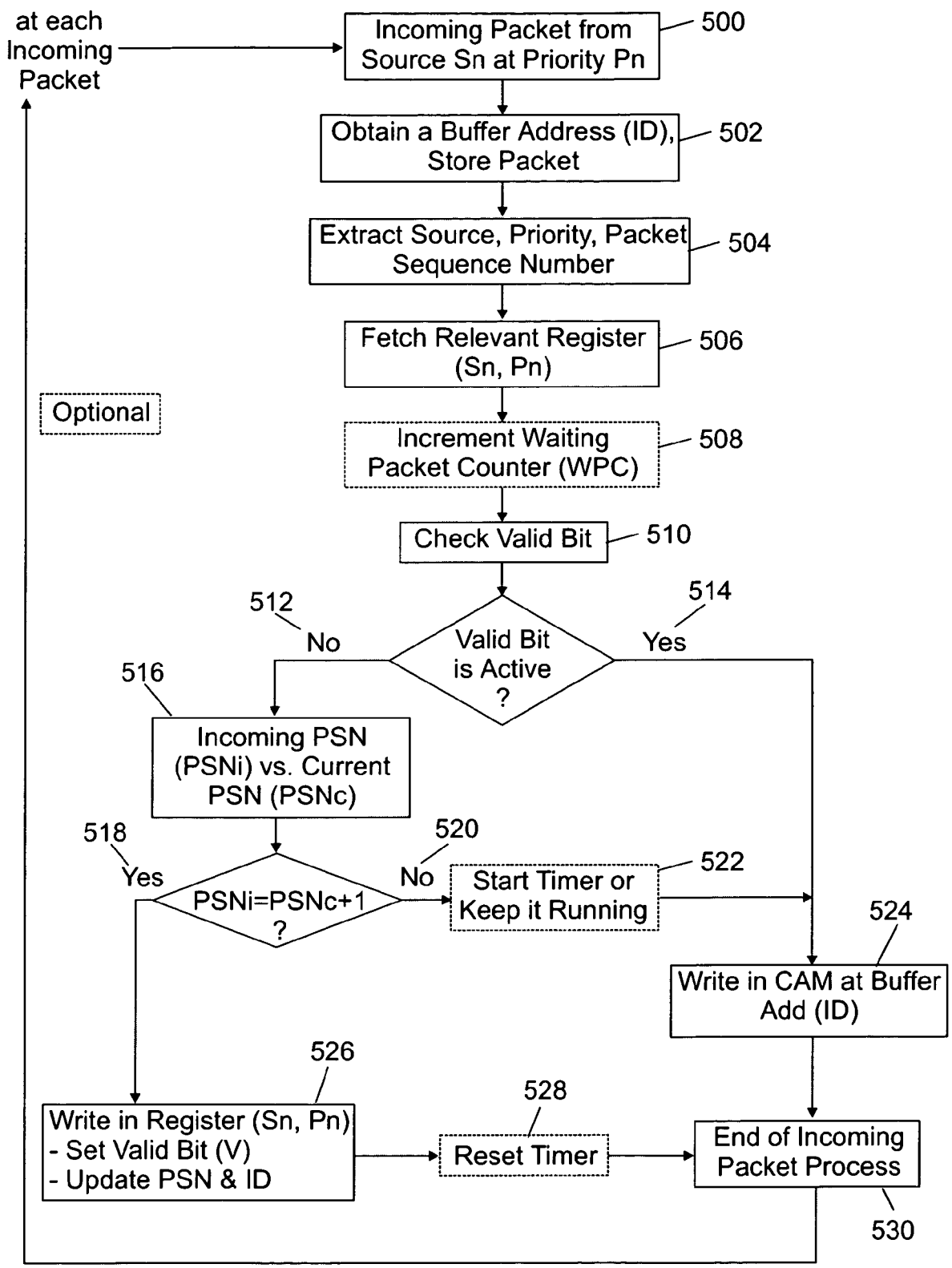
FIG. 5 is a flow chart of the incoming packet process in the egress adapter.

FIG. 5 describes the process of any packet received in the egress adapter through a PPS plane.

The process begins with a packet read out (500) from one of the switching plane (PLn) arrived from a given source (Sn) at a given priority (PTYn). On step 502, the packet is unconditionally stored in the egress buffer at the address obtained from the free buffer list.

Prior to or while storing the packet, its source identifier, its priority and its Packet Sequence Number (PSNi) (as set by the source in ingress adapter for unicast packet, or at input in egress adapter for multicast packet) are extracted (step 504). Source Sn and Priority PTYn are used as an index to retrieve on step 506 the corresponding source-priority register content (450) —which contains previously stored field Packet Sequence Number (PSNc)—with the associated valid-bit latch (455). An optional step (508) allows to increment the value of a 'Waiting Packet' counter (WPC). As it will be further explained with reference to FIG. 6, the Waiting Packet counter (WPC) may be considered as a possible solution to monitor the number of packets arriving from one source and waiting for being sent out on the Egress NPF Interface (290). If a packet is missing in a sequence, WPC increases because the following packets may continue to be received but without being forwarded to the egress NPF Interface (290). Hence, they must stay in the egress buffer taking up space until the missing packet is received.

Retrieved valid bit V is next checked on step 510. If V is found inactive (branch 512), then on step 516 Packet Sequence Number (PSNi) carried in the incoming packet and extracted in step 504 is compared with the current Packet Sequence Number (PSNc) retrieved in the register during step 506. If (branch 518) the Packet Sequence Number (PSNi) of the received packet is exactly the next in sequence value, after the current Packet Sequence Number (PSNc) stored in Source-priority register (450), i.e. PSNi=PSNc+1, this means that this packet is the expected one, i.e. is exactly the one following the last one which has been previously scheduled (and transmitted) for the corresponding source and priority. In which case, it is necessary to indicate this new packet as ready for scheduling by the Egress Packet Scheduling logic (280). This is performed on step 526 by updating in Source-priority register (450) the current PSN with the new value (PSNi) and the ID with the new buffer address and by setting active the corresponding valid bit V.

Optionally on step 528, there is the capability to reset the timer value retrieved at step 506 which ends the process of receiving a packet (530).

Going back to step 510, if the valid bit V is found active (branch 514), this means that there is already at least one packet waiting for being scheduled by the Egress Scheduling logic (280). Hence, CAM is updated (524) by writing at the egress buffer address or ID, address obtained on step 502, the three fields (422,424,426) Source (Sn), Priority (PTYn) and Packet Sequence Number (PSNi) of the incoming packet. Performing this Write operation makes that this new CAM entry be later retrieved by a Search operation which may be triggered in a future time as will be explained later. Then, no further processing is required for this packet (end of process 530).

Going back to step 516, if the Packet Sequence Number (PSNi) of the received packet is not (branch 520) the next in sequence value (is not PSNc+1) after the Packet Sequence Number (PSNc) stored in Source-priority register (450), then this packet is not the one following the last one which has been previously scheduled (and transmitted), and it cannot be scheduled to depart from the egress adapter (there is at least still one missing packet to be received). In that case, the process follows with step 524 as described above (i.e., a CAM entry must be performed for that packet so as to later retrieve it).

As an optional feature of the present invention, on step 522 the timer already mentioned above must be started or kept running if it was already triggered. As with the WPC this timer may optionally be used to monitor the re-sequencing of missing packets.

Figure 6:
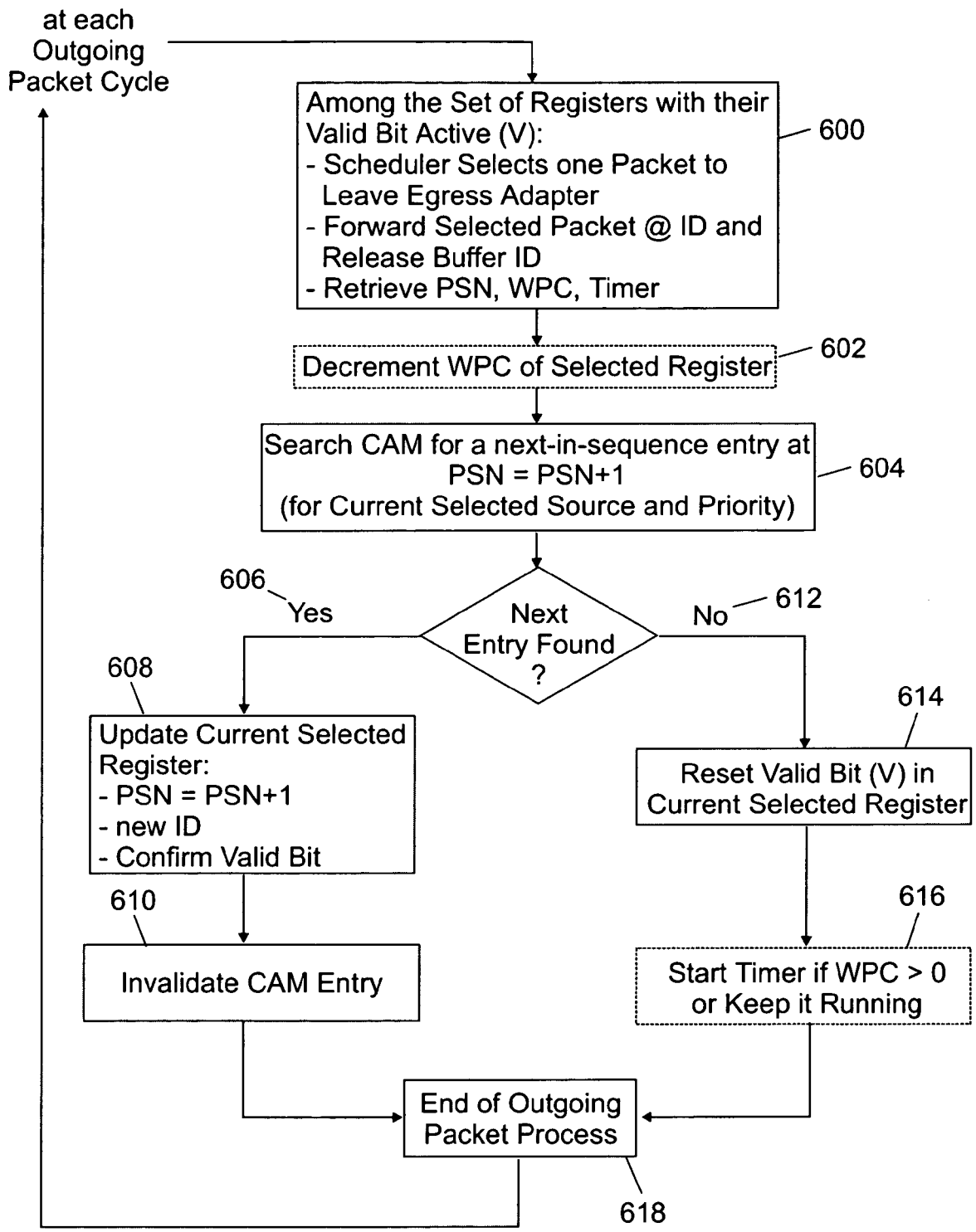
FIG. 6 is a flow chart of the outgoing packet process in the egress adapter.

FIG. 6 describes the process performed when a packet leaves the egress adapter. The selection of a packet due to leave the adapter is done on the basis of the valid bits posted to the egress packet scheduler (280) to let it know which ones of the source-priority registers have actually a packet, waiting in the egress buffer, that may be forwarded. All valid bits are permanently made available to the scheduler so as this latter has a full view of the waiting packets thus, has all the information it needs to make a decision at each outgoing packet cycle.

As already said, the algorithm on which the scheduler chooses a next packet to go is beyond the scope of the invention which does not assume any particular method of selection. In general, the waiting packets of the highest priority have precedence, however at a same level of priority, fairness must be exercised between all sources of traffic (including MC traffic which has its own sources i.e., either the ingress MC VOQ's or the switching planes as already discussed) and exceptions may have to be considered to the strict priority rule if, e.g., one wants to guarantee a minimum bandwidth to lower priority traffic. All of this is highly dependent on the architectural choices that are made to fulfill the requirements of a particular application.

The process begins on step 600 with the selection by the scheduler of one active valid bit. Corresponding register content is retrieved, i.e. Packet Sequence number and ID location of corresponding valid bit. Then, packet located at ID in egress buffer is immediately forwarded to egress adapter interface (290) and buffer is released to FBL.

Next, optionally the WPC counter of the selected source-priority register is decremented by one (step 602), as there is one packet less waiting for transmission in the egress buffer for this source and this priority.

On step 604, a Search operation is initiated in the CAM, with the Search Field (420) set with the source and the priority of the just gone packet. The last part of the Search Field is set with the Packet Sequence Number of the selected packet (PSNc) incremented by one, thus performing a search of the next-in-sequence packet. If the Search operation is successful (branch 606), it means that a packet coming from that source, having this priority and with a Packet Sequence Number exactly following the one of the packet which has been just scheduled, is already waiting in the Egress buffer. As a result of the Search operation, the buffer address at which this packet has been stored becomes available by performing standard operations of CAMs well known of those skilled in the art. As a reminder, the CAM is written with the fields Source, Priority and Packet Sequence Number at an address identical to the one of the egress buffer which was used to store the packet when it arrived from the plane (step 524).

On step 608, the current selected source-priority register indexed by the source and priority is updated with an incremented by 1 Packet Sequence Number. Moreover, the buffer address field is updated with the new address retrieved from the Search operation, and the valid bit is confirmed to the set value. It is to be noted that in order to guarantee that in a future Search operation having same search arguments, the just obtained address does not show up again, this CAM entry is invalidated (step 610). Then the process ends (step 618).

If the Search operation is not successful (branch 612), then it means that no packet coming from that source, with this priority and having a Packet Sequence Number exactly following the one of the packet which has been just scheduled, is waiting in the Egress buffer. Then corresponding valid bit is reset (step 614) to inhibit any further selection by the Scheduler (280).

As an optional feature of the present invention, there is on step 616 the capability to start or to keep running the timer value retrieved at first step (600). Purpose of this timer is to provide a mean to monitor the time elapsed since the last packet coming from one source for a priority has been scheduled and no in sequence packet from same source and same priority has been received. How these timers are processed, and which actions are triggered based on usage of these timers is not part of the present invention. WPC and timer are here mentioned to show how the invention can be straightfully accommodated to provide the necessary features to handle error or exception cases such as the loss of packets, or the trapping of lower priority packets in the independent switching planes of a PPS structure. This would result in the accumulation of packets in the egress buffer because too many incomplete sequences of packets, that cannot be forwarded over the egress NPF interface (290), are building up possibly to a point where egress adapter would be blocked. Those skilled in the art will recognize how the information provided by WPC's and timers can be used to prevent this from happening.

Finally, there is no further processing (ending step 618). It is worth noting that Waiting Packet Count (WPC) provides a mean for monitoring the number of packets having been sent by one source for one priority and waiting in Egress buffer, either because Packet Scheduling logic (280) does not schedule any packet for this source and this priority when the corresponding V bit (455) is active, one reason possibly being that higher priority packets from same or other sources are to be scheduled, or because Packet Scheduling logic (280) is not able to schedule any packet for this source and this priority because corresponding V bit (455) is inactive, meaning that the next to schedule packet (for this source and priority) has not yet been received in the Egress buffer, leading to unsuccessful Search in CAM operations. Although one can easily imagine that letting Waiting Packet Counts (WPC) increasing without any control, may lead to Egress buffer saturation and blocking of the system. It is not a purpose of this invention to provide directions for using it.

The above described solution is to be compared to a prior art system having 70×8 linked lists wherein the head of each list being represented by the 70×8 source-priority registers, each one associated to its valid bit. However, on the contrary of linked lists, the 'linking' with the next packet virtually belonging to the same list is performed only when a source-priority register has been updated after a successful search in the CAM has occured. As long as there is no successful search, the corresponding 'linked list' —identified by the source and related priority (together with the current Packet Sequence Number)—is empty. The proposed mechanism has the clear advantage over linked list solutions of being able to store packets independently of the order in which they arrive in the Egress buffer, while this is a much more complex task to perform using linked list where insertion of buffer pointers for new incoming packets among already linked buffers is not an easy task and requires complex pointers operations.

Figure 7:
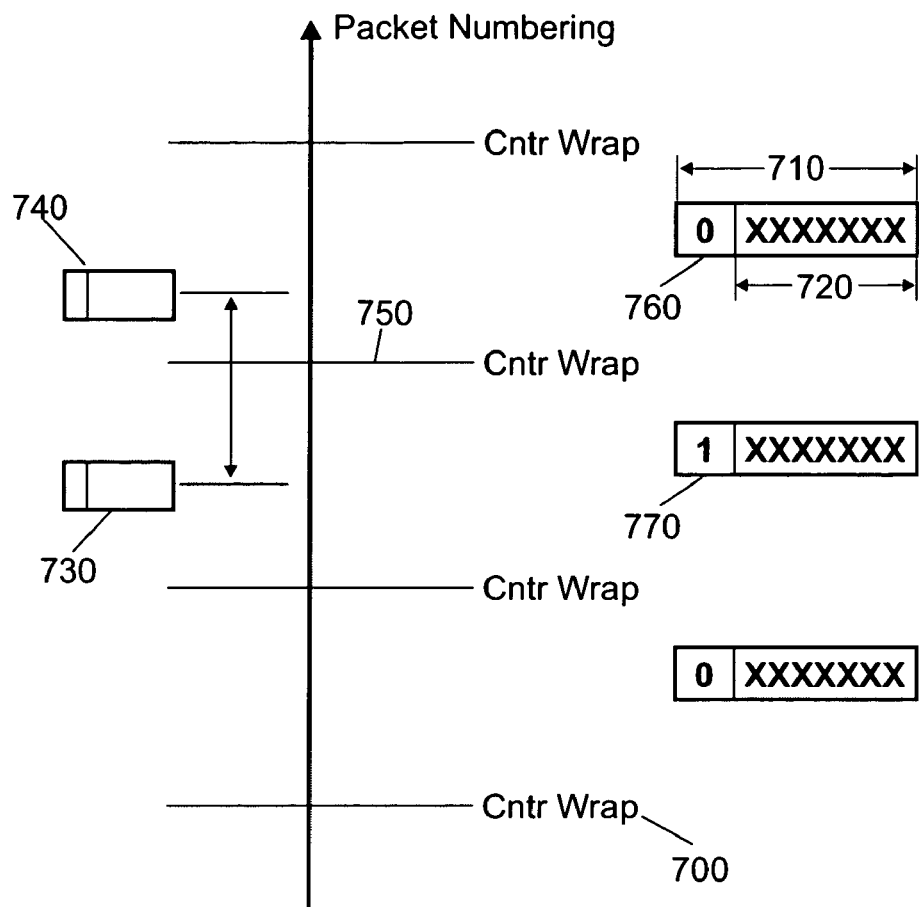
FIG. 7 is a schematic view to illustrate the wrapping of the source counters.

FIG. 7 briefly discusses the problem of the wrapping (700) of the counters used to rank packets at ingress or at egress. Those counters have a finite length thus, whichever their counting capacity the problem of their wrapping must be solved. The invention assumes that those counters have one bit more (710) than what is necessary to number the packets. For a given application the counting capacity (720) must be determined so that the oldest numbered packet still waiting in the egress buffer (730) cannot be wrongly compared with a new arriving packet (of the same source with the same priority) because the counter used in the source has wrapped in the mean time. Once this value has been determined the invention assumes that the counters are all made one bit wider so that numbering of waiting packets cannot span on more than one counter wrapping boundary (750). Then, it is easy to take care of the counter wrapping. One solution consists in detecting the first occurrence of a packet number for which MSB (most significant bit) is found to be 0 (760) after a series of ones. In which case the egress resources must immediately start to use PSN fields in toggling the value of the MSB bit.

Finally, it must be clear to those skilled in the art that the resequencing according to the invention as described here above in FIGS. 2 to 7 does not require any dedicated resources to implement a transparent switch over for unicast traffic in case of failure of a switching plane. Indeed, ingress adapters (load balancing function) may be instructed to skip a plane any time in view of its replacement or, for any reason, while all egress adapters keep resequencing transparently since the scheme according to the invention neither require that all planes be active nor make an assumption on the way traffic is load balance by the ingress adapters thus, meeting the objective of having a free transparent switch-over mechanism for unicast traffic as a result of the use of the invention.

While the invention has been particularly shown and described with references to an embodiment, it will be understood by those skilled in the art that various changes in both form and detail may be made therein without departing from the scope and spirit of the invention.

Having thus described our invention, what we claim is as follows:

The invention claimed is:

1. A system for resequencing received data packets comprising:
   a first means for storing each received data packet at an allocated location within said first means;
   a Content Address Memory (CAM) having at least one entry comprising an identification field to contain a packet buffer identifier (ID) field to identify an allocated location in said first means whereat a received data packet is placed, a search field to contain a source identifier of a source providing said receive data packet, a priority level for said receive data packet and a sequence number for said receive data packet, wherein recited fields are concatenated;
   a plurality of source-priority registers each containing, a packet sequence number (PSN) and a packet buffer identifier (ID) of a data packet previously transmitted from said first means; and
   a plurality of valid-bit latches respectively associated to the plurality of source-priority registers to set an active status to indicate that corresponding stored data packet is the next one in sequence, wherein the number of source-priority registers and associated valid-bit latches are equal to the number of sources providing packets multiply by number of priority levels.

2. The system of claim 1 wherein each of the plurality of source-priority registers further comprise counting means to count for each sequence of data packets the number of data packets stored within said storing means waiting for being output from at least one egress adapter.

3. The system of claims 2 further comprising scheduling means (280) coupled to the CAM and the plurality of source priority registers for selecting one sequence of data packets from which a data packet is to be output from the at least one egress adapter.

4. The system of claim 3 wherein the scheduling means are coupled to the plurality of valid-bit latches to select one valid-bit latch among the valid-bit latches having their valid bit active.

\* \* \* \* \*